June 17, 1958

S. JAFFE ET AL 2,839,380

PRODUCTION OF CALCIUM METAL

Filed June 13, 1955

INVENTORS
SIGMUND JAFFE
JOHN M. PARKS

BY
H. Hume Mathews

ATTORNEY

June 17, 1958  S. JAFFE ET AL  2,839,380
PRODUCTION OF CALCIUM METAL
Filed June 13, 1955  3 Sheets-Sheet 2

INVENTORS
SIGMUND JAFFE
JOHN M. PARKS
BY
ATTORNEY

June 17, 1958
S. JAFFE ET AL
2,839,380
PRODUCTION OF CALCIUM METAL
Filed June 13, 1955
3 Sheets-Sheet 3
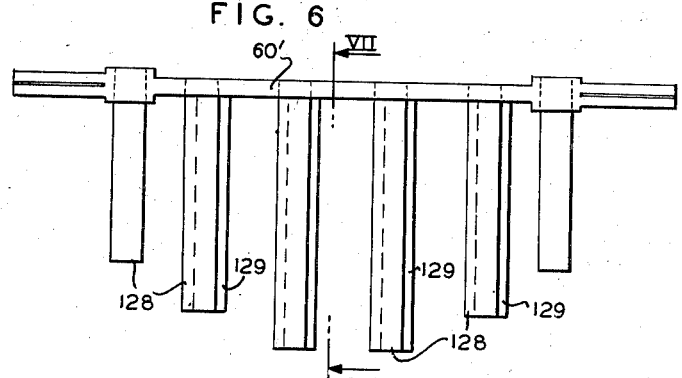
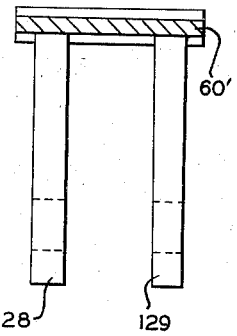
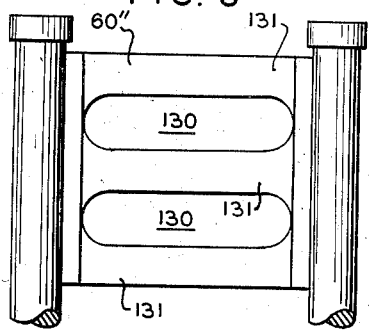
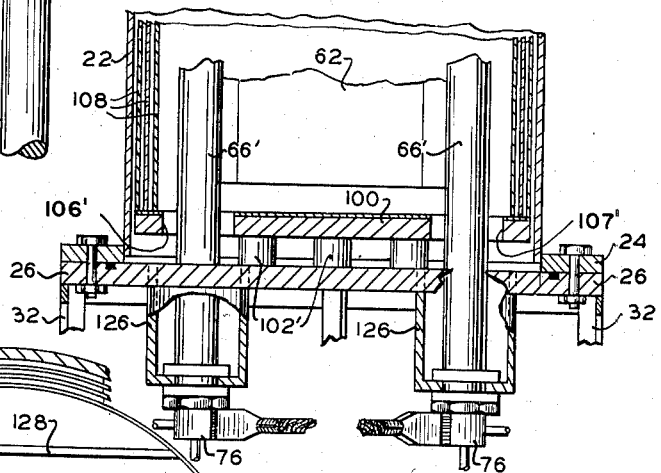
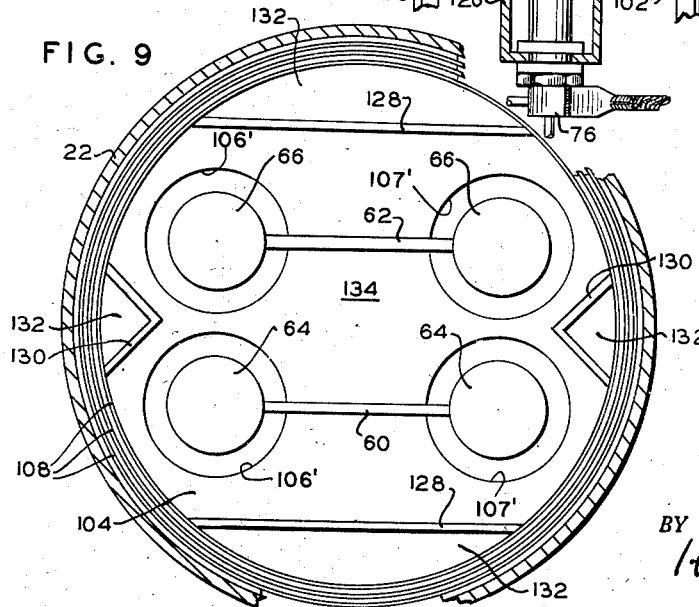
INVENTORS
SIGMUND JAFFE
JOHN M. PARKS
BY
ATTORNEY

United States Patent Office 2,839,380
Patented June 17, 1958

2,839,380

PRODUCTION OF CALCIUM METAL

Sigmund Jaffe, Plainfield, and John M. Parks, Summit, N. J., assignors to Air Reduction Company, Incorporated, New York, N. Y., a corporation of New York Application June 13, 1955, Serial No. 514,891

21 Claims. (Cl. 75—10)

This invention relates to a method of producing calcium metal by thermal dissociation of calcium carbide, and to apparatus used therefor.

Calcium has wide application as a reducing agent in various commercially used metallurgical processes, such as the manufacture of high grade steel. It is also useful for other purposes, including the preparation of certain rare metals. For this latter use, it is esential that the calcium metal be of extremely high purity.

Calcium has been produced commercially by reduction of calcium oxide with aluminum and, also, by electrolysis of molten calcium chloride. However, these methods are extremely costly and are extremely difficult to perform. Consequently, calcium is presently available for commercial uses only on a very limited supply basis, which is inadequate to satisfy the growing demand for this material, and at a very high cost. Aside from the immediately apparent disadvantages, these conditions create the further disadvantage of retarding the investigation and development of new processes and products, which might make beneficial use of this metal were it now for its present prohibitive cost.

It has been proposed (see, for example, U. S. Patent No. 984,503, issued in 1911), to obtain calcium by direct thermal dissociation of calcium carbide, as represented by the following equation:

(1) 

According to this reaction, normally conducted at subatmospheric pressures, calcium vapor is given off when a charge of calcium carbide is heated to the dissociation temperature and is then obtained as metallic calcium by condensation. However, this method of production has been, for all practical purposes, largely theoretical. Up to the present time, it has been capable of practice only on an extremely small scale, such as in the laboratory, and numerous problems associated therewith have remained unsolved. Generally speaking, such reaction has never been carried out with any reasonable degree of consistency or with the successful attainment of a suitable product, at a rate of production approaching commercial feasibility.

One of the difficulties encountered in the thermal dissociation process is that of obtaining directly, without redistillation, a calcium metal product of high purity. This problem is also encountered in the electrolytic and aluminum reduction methods mentioned above.

A further problem has been the objectionable occurrence of sporadic formations of fused materials within the heated charge bed, and of relatively gas-impervious crusts on the surface of the charge bed, during the reaction. Although all of the possible adverse effects of such sporadic formations and surface crusts are not completely understood, it is believed that they seriously retard the diffusion of the calcium vapors liberated in the charge and thus reduce the effective rate of the dissociation reaction. It has been found, furthermore, that a considerable amount of calcium metal often is condensed in the charge bed and obtained from the reaction as a substantially useless waste in the reaction residue. This latter condition exists to a considerable extent, particularly when relatively large batches of charge material are treated in a single reaction and thus constitutes a significant factor at commercial production levels.

Numerous difficulties, also, are involved in the provision of suitable apparatus for carrying out the thermal dissociation process. It is necessary, for example, to protect the walls of the furnace apparatus in some manner since the operating temperatures of the dissociation reaction are considerably higher than the temperatures to which the usual metal container or charge box of a furnace may be safely subjected. Conventional refractory linings, such as silicon or alumina bricks, cannot be tolerated in the reaction chamber due to the contaminating gases that would be evolved from these materials. One type of apparatus that has been proposed utilizes a graphite crucible in which the charge is placed, thus effectively retaining the charge during heating and isolating it from direct contact with the walls of the furnace. However, the use of such a container is not always desirable. For one thing, a container such as a graphite crucible is relatively fragile and requires careful handling during operation of the furnace. In addition, the removal of the residue remaining in a conventional closed bottom crucible, at the completion of each treatment, would be a laborious task in a large installation, requiring the uneconomical use of time and manpower.

Heretofore, the apparatus for heating the charge material has been limited substantially to the use of resistance type heating elements arranged around a crucible in which the charge material is held. The heating elements direct heat against the sides of the crucible which, in turn, becomes heated and passes the heat into the charge material therein. A considerable portion of the heat in this type of apparatus is lost, however, and such expedients are not entirely satisfactory.

Further difficulty has also been encountered in isolating the calcium metal by means of condensation of the vapors evolved from the dissociation reaction. Under some circumstances an "active" calcium deposit is formed which has been found to readily ignite when exposed to the atmosphere, upon the slightest concussion or abrasion. Inasmuch as these conditions are normally present in the handling of the product during commercial type processes, the possibility of obtaining the "active" form of the calcium product represents a potential hazard to the operators of the apparatus as well as a means of possible uneconomical loss of the product.

A primary object of the present invention is to provide an improved method and apparatus for obtaining calcium by the thermal dissociation of calcium carbide in which the difficulties hereinbefore described are largely overcome.

A further object is to provide a novel method and apparatus for producing high purity calcium by direct condensation of calcium vapor, separated in the substantially pure state from the gaseous reaction products of the thermal dissociation of calcium carbide.

In accordance with the present invention these and other objects and advantages are obtained by heating a charge of calcium carbide, to a reaction temperature sufficient to cause dissociation and liberation of calcium vapors therefrom, passing the evolved vapors through a preliminary condensation zone in which extraneous gases are separated from the calcium vapors, and thereafter obtaining the metal calcium condensate substantially free of impurities. The temperature at which the dissociation reaction may be carried out in accordance with the invention is within the range of about 1300° C. to 2600° C. and is preferably within the range of 1800° C. to 2200°

C. The preliminary condensation zone is preferably controlled to provide a temperature zone substantially of from 850° C. to 1100° C., and the calcium vapors are condensed at a temperature within the range of 250° C. to 500° C.

The dissociation reaction can occur at temperatures above the prescribed upper limit of 2600° C., but the difficulties encountered at such temperatures in the provision of adequate thermal insulation and in maintaining adequate structural strength of the necessary apparatus render the method impractical. The desired operating conditions for efficient production of the calcium metal product are obtained most readily in the preferred reaction temperature range of 1800° C. to 2200° C. In a preferred mode of operation the dissociation is carried out by heating a bed of calcium carbide of greater than 88% purity to the reaction temperature in a closed chamber, evacuated to a pressure at least below the dissociation pressure of the calcium carbide at the reaction temperature, condensing the resulting calcium vapors in substantially pure form on a cooled surface forming a wall of said chamber, not directly exposed to heat radiation from said charge bed, and interposing between the reacted charge material and said condenser surface, a baffle means effective, preferentially, to separate undesired impurities by condensation, at a temperature of from 850° C. to 1100° C. Said condenser surface preferably is arranged in substantially confronting relation to the charge bed and the baffle means comprises a grid which is interposed therebetween and arranged to shield said condenser surface from the heat radiations given off by the charge bed. In a further preferred embodiment the carbide charge is caused to form its own crucible by an arrangement wherein only the central portion of the carbide bed is raised to dissociation temperature which is surrounded by a boundary layer of unreacted charge material. It is preferred, in addition, that such boundary layer of charge material be heated at least to 850°–900° C.

Preferably, the reaction, according to the invention, is carried out at sub-atmospheric pressures such that the evolution of dissociated calcium vapor from the charge bed and the passage of such vapors to the condensing surface is facilitated and the loss of product due to reaction with the atmospheric gases is avoided. In the present method, the chamber should be evacuated at least below the dissociation pressure of calcium carbide, corresponding to the reaction temperature, in order to obtain rates of vaporization from the charge, which will not constitute a limiting factor in the reaction. For example, at the preferred operating temperature of 2100° C., the evacuation pressure should be less than 20 mm. Hg, which is the dissociation pressure of calcium carbide at this temperature. The lower limit of the pressure, below which the reaction chamber should not be evacuated, preferably corresponds to the equilibrium vapor pressure of calcium at the condenser, determined by the temperature of the condenser. At the minimum condenser temperature of 250° C., the corresponding equilibrium vapor pressure for calcium is much less than one micron Hg, which thus constitutes the preferred lower limit of the evacuation pressure. Generally, evacuation pressures below one micron Hg afford no material advantages, and evacuation pressures of from one to fifty microns Hg are suitable, within the preferred ranges of reaction temperatures and condenser temperatures.

The provision of a preliminary condensation zone in accordance with the present invention enables many of the difficulties inherent in the carbide dissociation process to be overcome. By this means, impurities present in the charge material and impurities formed in the dissociation process can be separated and removed in the course of the dissociation-condensation process, thus reducing or eliminating the need for a subsequent purification or distillation of the calcium product. Examples of such impurities that can be so separated and removed are calcium oxide, carbon, and calcium cyanamide, which are present in the dissociation process. It is believed that there are at least four side reactions which may occur during the dissociation of the calcium carbide, as a result of residual amounts of these impurities in the charge material and in the condensation products. These reactions may be illustrated by the following equations:

(2) $$CaO + 3C = \underset{\text{(solid)}}{CaC_2} + \underset{\text{(gas)}}{CO}$$

(3) $$2CaO + CaC_2 = \underset{\text{(gas)}}{3Ca} + \underset{\text{(gas)}}{2CO}$$

(4) $$\underset{\text{(solid)}}{C} = \underset{\text{(gas)}}{C}$$

(5) $$C + CaCN_2 = \underset{\text{(solid)}}{CaC_2} + \underset{\text{(gas)}}{N_2}$$

It will be seen from these reactions that, in addition to the desired calcium vapors from the reaction of Equation 1 hereinbefore given, there are evolved, also, from the charge, some amounts of "extraneous" gases including predominantly CO plus some $N_2$ and possibly some carbon gas produced by sublimation of the carbon and graphite in the reaction zone. Under ordinary circumstances, without the benefit of the present invention, these "extraneous" gases co-exist with the evolved calcium vapors and pass with the calcium vapors to the condenser, at which point the reactions given above revert to form CaO, C, $CaC_2$, and $CaCN_2$ which are deposited at the condenser and thus contaminate the desired calcium product. The rate at which the extraneous gases are produced is substantially greater at the higher reaction temperatures, above 1800° C., which are preferred according to the present invention.

A principal effect of the preliminary condensation zone of the present invention is to cause the condensation of impurities such as referred to above, consisting predominantly of calcium oxide, with relatively smaller amounts of calcium carbide, carbon, and calcium cyanamide, and thereby to reduce or substantially eliminate contamination of the calcium condensation product. With the interposition of a preliminary, or intermediate, condensation zone, in accordance with this invention, the reversion of the above reactions occurs at the baffle instead of at the condenser. Hence, substantially all of the "extraneous" gases evolved from the dissociation of the calcium carbide charge are removed in the intermediate condensation "cold trap" and only the calcium vapors are permitted to proceed to the condenser where a substantially pure product is then obtained. The upper limit of 1100° C. for the preferred operating temperature of the preliminary condensation zone is based upon the calculated upper temperature at which reversion of the reactions 2 to 5 above will occur to a suitable extent. The lower limit of 850° C., corresponds to the temperature below which calcium metal also may be condensed and the impurities thus not removed preferentially. In the ranges of operating reaction temperatures and evacuation pressures which are preferred in accordance with the present invention, the most preferred, controlled temperature for the condensation of the undesired impurities is about 900° C.

The removal of the extraneous gases by reversion of the reactions given above, occurs substantially only when the gases are in contact with a suitable heat exchanger surface, substantially at the prescribed preliminary condensation temperature. The presently preferred method for producing such preliminary condensation of extraneous gases is by providing a grid type trap, or baffle, which is spaced from the surface of the charge bed, and through which the vapors are made to pass. In order to afford the maximum effectiveness, the heat exchanger means, in addition to being maintained at the desired temperature should also afford a large surface contact area in the path of the vapors evolved from the heated charge bed, commensurate with the smallest possible reduction in the total flow area of the vapors. It has been observed that when the intermediate condensation zone presents a relatively small surface contact area, the removal of impurities may be incomplete with a resulting reduction in the purity of the calcium product. On the other hand, baffle means producing a drastic reduction of the effective flow area in the chamber through which the evolved vapors are conducted have been found to decrease materially the over-all rate of the reaction. The most desired surface contact area and effective flow area for the preliminary condensation zone may best be determined experimentally for various operating conditions.

It has been found in the devolpment of the present invention that unobvious, unexpected, and greatly improved results can be produced by utilizing, as the furnace charge material, a calcium carbide of unusually high purity, in excess of 88% pure. Such carbide, which has not heretofore been generally available commercially, has a $CaC_2$ content greater than 88%, and the gas yield of the carbide, defined as the volume (cubic feet) of $C_2H_2$ obtained per pound of calcium carbide by slaking, is greater than 5.2 ft.$^3$/lb. A gas yield of 5.97 corresponds to the gas yield of a theoretically 100 percent pure calcium carbide. These values are all determined according to the definitions of Federal Specification O–C–101a, July 22, 1949, of the Federal Standard Stock Catalog of the U. S. Government. The difference between the actual and the theoretical gas yield is a quantitative measure of the impurities, consisting principally of calcium oxide, the most objectionable impurity in the thermal dissociation reaction. Present commercial grades of calcium carbide do not exceed 85% pure calcium carbide content and, generally, have a gas yield of less than 4.8 cu. ft./lb.

The use of such high purity calcium carbide has been found to provide significant advantages in the performance of the thermal dissociation reaction and in the operation of the furnace apparatus which are not attainable by any other means. The principal beneficial effect derived is the substantial elimination of the sporadic formations of fused material and surface condensation crusts which otherwise would be formed in the charge bed, particularly at reaction temperatures above 1800° C. A further significant advantage results from the greatly increased thermal conductivity of the high purity calcium carbide. Thus, the charge bed, when comprised of particles of such high purity carbide, is heated to the necessary reaction temperature with considerably less power input than is otherwise required and is, furthermore, heated more uniformly than has been possible previously. In addition, the high purity carbide charge of the present invention provides a drastic reduction in the amounts of the concretions formed by condensation of the extraneous reaction gases and enables a more pure calcium product to be obtained, as compared to charge material of 85% or lower purity carbide dissociated under the same operating conditions. When high purity carbide, having a purity of 88% or higher is used in the thermal dissociation reaction, it is possible, even without the advantageous use of the baffle, or preliminary condensation, means as described herein, to obtain a calcium metal product of much higher purity than was heretofore available and which is sufficiently pure for use directly in many commercial applications.

Still further objects and advantages of the invention will be apparent to those skilled in the art from the following detailed description and explanation of certain specific embodiments and examples of the invention, including a particular form of apparatus and a mode for operating the same. In the following description reference is made to the accompanying drawings in which:

Figure 5 is a partial vertical section of the furnace shown in Figures 1 and 2, illustrating a modified construction of the bottom of the furnace and of the arrangement for seating the resistor supporting posts therein;

Figure 6 is a top plan view showing an alternative form of construction for the resistor heating elements used in the furnace shown in Figure 1;

Figure 7 is a vertical section taken along the line 7—7 in Figure 6, looking in the direction of the arrows;

Figure 8 is a side elevation view, showing a further modified construction of the resistor heating element for the furnace shown in Figure 1; and Figure 9 is a sectional plan view taken along a horizontal plane substantially below the level of the baffle element in Figure 1, illustrating an alternative arrangement of the furnace hearth in which a series of bulkhead partitions are disposed therein.

Figure 1:
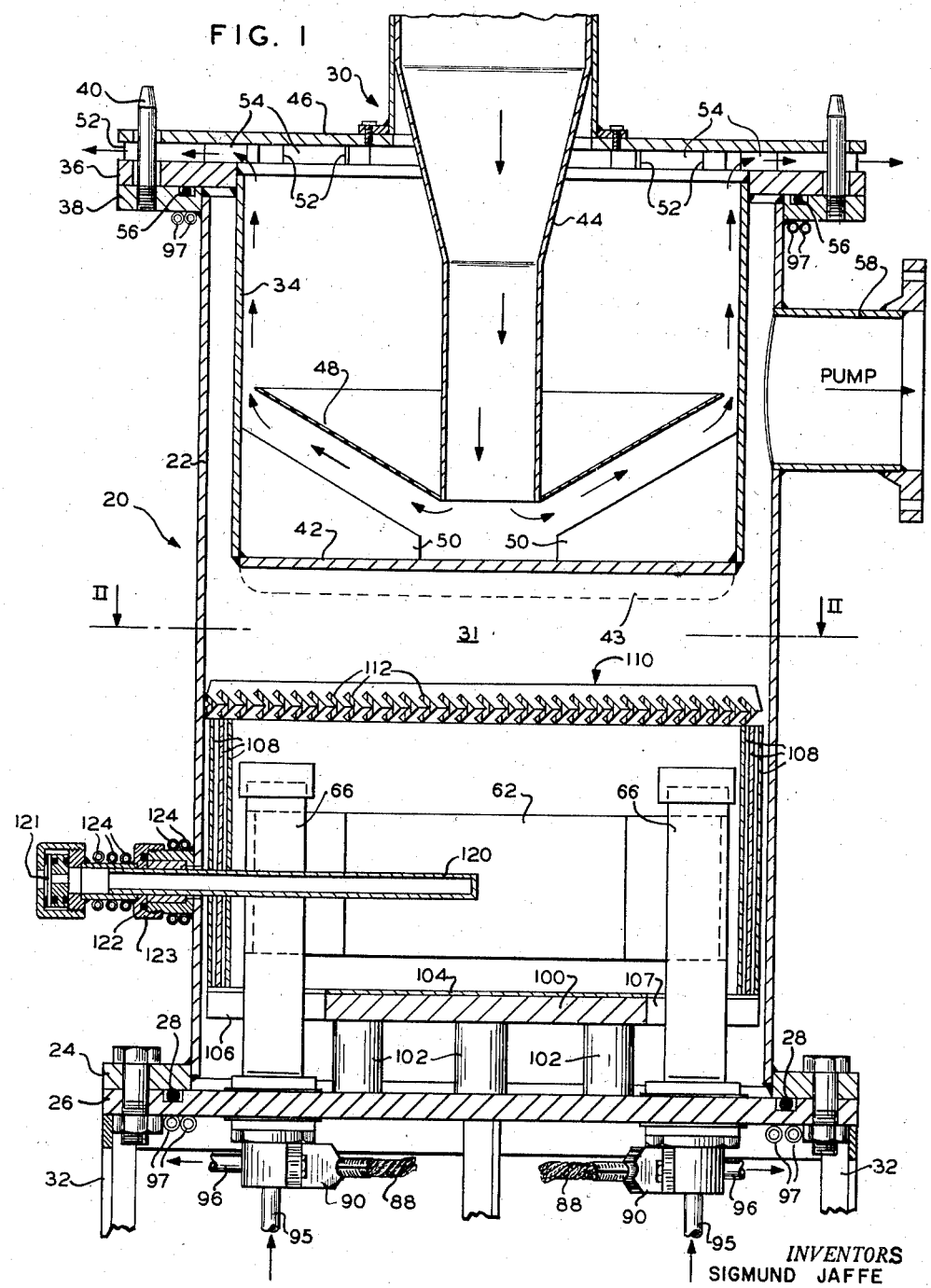
Figure 1 is a front elevation view in section, showing one embodiment of a furnace apparatus which may be used to carry out the thermal dissociation of calcium carbide for the production of calcium metal according to the present invention, having a grid-type preliminary condensation baffle.
Figure 2:
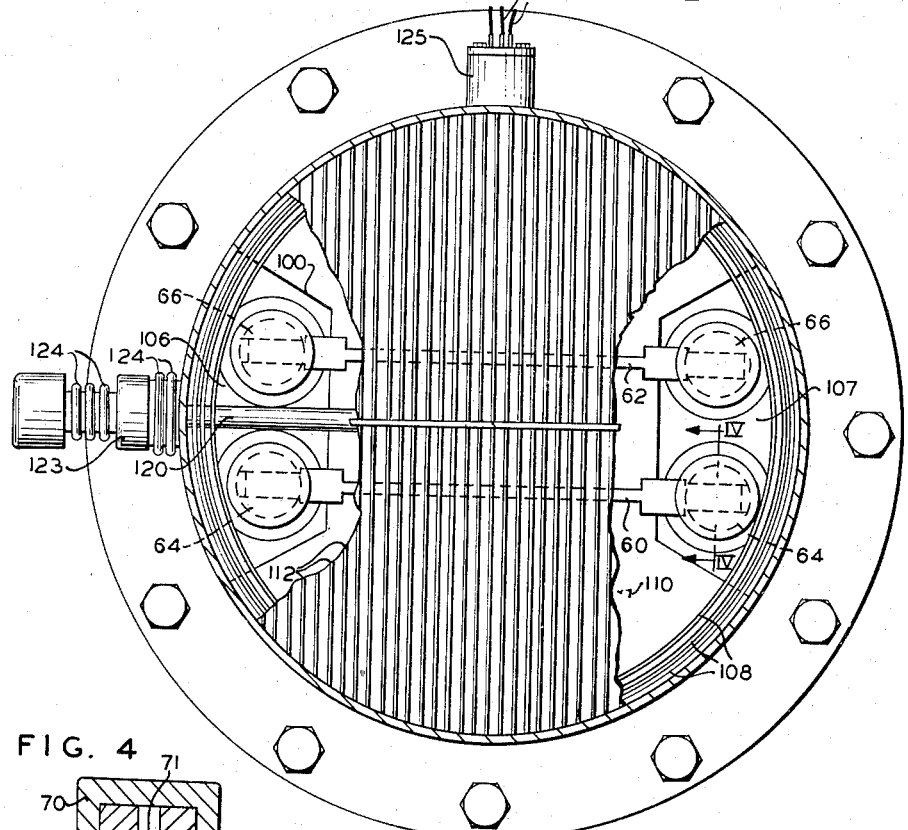
Figure 2 is a sectional view taken on a plane along the line 2—2 in Figure 1, looking in the direction of the arrows, in which a portion of the preliminary condensation baffle is broken away.

Referring now to the drawings, a furnace, suitable for carrying out the reaction according to the present invention, is designated generally by the numeral 20, in Figures 1 and 2. The furnace 20 comprises a vertical cylindrical steel shell 22 having an annular flange 24 at its bottom to which is bolted a bottom plate 26 having an O-ring type gasket, sealing device 28. At its upper, open end the furnace shell receives a removable condenser housing 30, on which the calcium metal product is deposited as will be more fully explained and which forms a top closure for the reaction chamber 31 defined by the furnace shell. The furnace and condenser housing thereon are carried by a supporting framework 32.

The condenser apparatus consists of an inverted cylindrical shell 34 having an annular flange 36 around the upper end thereof which is received and supported on a rim flange 38 of the furnace shell. Proper alignment with the top opening of the furnace is afforded, when the condenser is seated thereon, by means of a series of guide pins 40. The cylindrical shell 34 forms a well, projecting downwardly into the top of the reaction chamber 31, which is spaced from the side walls of the furnace to provide an annular space therebetween. The shell 34 terminates in a bottom plate 42, constituting the effective condenser surface, on which the calcium metal is deposited as indicated by the dotted line 43.

Air for cooling the condenser plate 42 and maintaining the desired condenser temperature is delivered to the condenser shell through an air duct 44 supported by a top plate 46. A diffuser cone 48 at the lower end of the duct forces the cooling air to circulate radially outwardly toward the sides of the condenser shell and thence upwardly as indicated by the arrows in Figure 1, showing approximately the path of the circulating air. A series of radial fins 50 are arranged around the bottom of the condenser shell 34 to provide a sufficient surface area for dissipation of the heat, absorbed upon the calcium vapors, to the air coolant. The top plate 46 is integral with the condenser shell and flange 36 but is raised therefrom by the spacer blocks 52 which provide openings 54 therebetween through which the cooling air may be discharged to the atmosphere. Air is delivered to the duct 44 by any conventional delivery system including a blower device and preferably, also, means for enabling regulation of the air flow whereby the temperature of the condenser surface may be controlled. Such expedients are well known and need not be described in detail.

In the construction shown herein an annular O-ring type gas sealing means 56 is placed between the annular flange 36 and flange 38 of the furnace shell to provide the desired gas tight seal. When initially placed on top of the furnace the condenser creates a sealing pressure by its own weight. When the reaction chamber is later evacuated as will be more fully described herein the differential atmospheric pressure acting thereon affords a proportionately higher gasket sealing pressure sufficient to prevent leakage even at the extremely low vacuum pressures used.

An outlet 58 is formed in the side wall of the furnace substantially at the upper portion thereof above the bottom of the condenser shell, which may be connected to any suitable evacuation apparatus for reducing the pressure in chamber 31 to the desired evacuation pressure. In order to simplify the illustration of the furnace, the pump or evacuation equipment, which is well known to those skilled in the art, has not been shown in the drawings.

Figure 4:
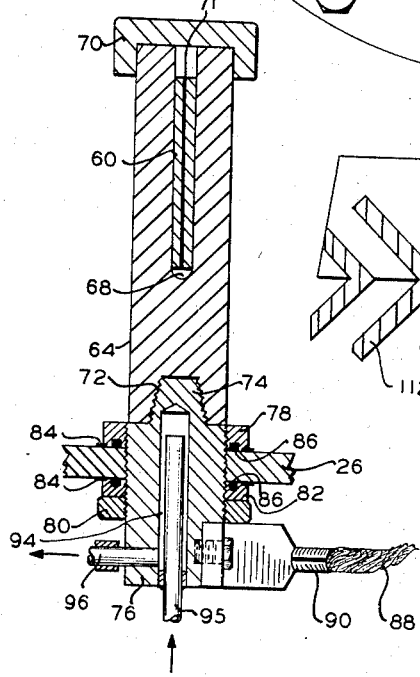
Figure 4 is an enlarged vertical section through one of the resistor supporting posts, taken along the line 4—4 in Figure 2, looking in the direction of the arrows, showing the detailed construction thereof.

The heating means for the furnace comprise resistor heating elements 60 and 62, Figure 2, which are in the form of elongated, rectangular bars, or plates, which are disposed at the lower end of the reaction chamber 31 and extend substantially across the width thereof. The resistor heating elements are of a well-known type, made of a suitable material, such as graphite, which becomes heated upon passage of electric current therethrough and are supported, respectively, in connector posts 64 and 66. The resistor elements are secured in the supporting connector posts as best shown in the representative sectional view of one of the posts 64, in Figure 4. It will be seen that the upper end of each of the connector posts, as illustrated by the post 64, is bifurcated to provide a vertical slot 68 in which the ends of the resistor elements are seated. A locking cap 70 forced over the top of the bifurcated post presses inwardly against the bifurcated portions to produce a pressure contact thereof with the sides of the resistor elements. A narrow slot is also formed at the ends of each of the plate-type resistor elements to provide a further degree of resilience for maintaining a pressure contact with the connector posts. These slots are not visible because they are closed when the resistor elements are in place. However, the closed slot in the end of plate element 60, in Figure 4, is represented by the vertical line 71 corresponding to the abutting inner faces of the end slot. Each of the connections is thus made such as to insure adequate electrical contact while at the same time permitting the heating elements to be easily dismantled for replacement or repair.

Each of the vertical connector posts has a threaded socket 72 at its lower end, as seen also in Figure 4, which is received on the threaded stud 74 of an electrical terminal fitting 76 that projects through the bottom plate of the furnace. The terminal fitting 76, made of a suitable electrically-conductive material such as copper, is secured in the bottom plate of the furnace by means of a nut 78, silver soldered in a gas-tight fashion on the inner body portion of the terminal fitting, and a lock nut 80 threaded on the projecting portion of the fitting which forces a washer 82 against the outer face of the furnace bottom. This arrangement affords a firm support for the terminal fitting in the furnace bottom and permits the fitting to be easily removed, if desired. Insulating washers 84 are interposed between the nut 78 and washer 82 and the adjacent faces of the furnace bottom plate to prevent short-circuiting of the electric circuits. O-ring type sealing gaskets 86 are also disposed between these members to produce an effective gas tight seal. Current may be supplied to the resistor heating elements through the terminal fittings and connector posts from any conventional source of electric power by means of high current capacity conductors 88 having end lugs 90 which may be bolted to the bottoms of the terminal fittings 76, best seen in Figure 1. The terminal fittings 76 are water-cooled, each being provided with a water-cooling passage 94 through which water is circulated by tubular conduits 95 and 96. Water cooling, for protection of the O-ring gasket members at the upper and lower flanges of the furnace, is provided by a system of cooling coils 97 through which water is circulated, also, during the operation of the furnace.

The region at the lower portion of the reaction chamber 31 in the immediate vicinity of the resistor heating elements constitutes the heating zone, or hearth, of the furnace in which a horizontal hearth plate 100, resting on a series of spacer blocks 102 on the bottom of the furnace, supports the body of the charge material placed therein. The plate 100 and the supporting blocks are made of graphite, and the plate is covered with a thin sheet 104 of steel which is for the purpose of protecting the graphite plate from the calcium vapors generated in the dissociation reaction which otherwise tend to deteriorate this graphite surface. The hearth plate is cut out at 106 and 107 to accommodate the vertical resistor supporting posts 64 and 66 and, except for these openings, extends completely across the interior of the furnace such as to form, substantially, a bottom retaining wall therein. The level of the plate may be adjusted by the use of spacer blocks of different heights. Primarily, the use of the horizontal bottom plate 100 in the present furnace apparatus is to permit adjustment of the effective bottom extent of the carbide charge with respect to the resistor elements. Varying distances may thus be provided for different operating conditions. In a furnace device, however, that is intended for constant operation under one set of conditions such an adjustable bottom plate is unnecessary and in that event the resistor elements may be disposed at a specific optimum distance from the bottom wall of the furnace as determined by the desired operating conditions for such specific apparatus. In the operation of this apparatus, it is customary to tamp, or suitably tightly pack fine particles of the charge material around the supporting posts 64 and 66 in the cut-away openings 106 and 107, to thereby provide an effective barrier which prevents the passage of calcium vapor therethrough to the space below the bottom plate which may be at a temperature below 850–900° C. The bottom plate thus constitutes an effective barrier at the bottom of the reaction chamber and is desirably above the temperature of 850–900° C. as herein described.

A series of three concentrically disposed cylindrical shells 108 made of relatively thin sheet steel or other suitable metal provide a system of radiation shields around the heating zone occupied by the charge bed. Any suitable means may be provided to maintain the spacing between the concentric radiation shells, which it will be seen are open at the top, such that these spaces become evacuated at the same time the reaction chamber is evacuated. The radiation shields are supported on the horizontal plate 100.

Figure 3:
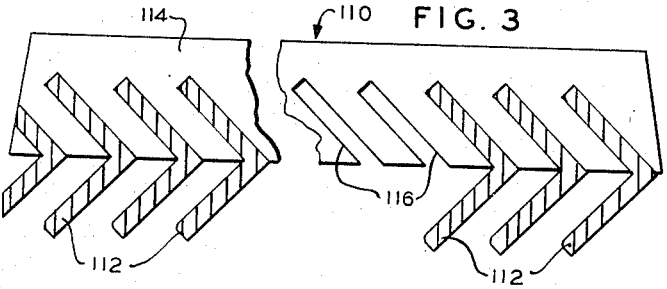
Figure 3 is an enlarged sectional view of the preliminary condensation baffle means for the furnace shown in Figure 1 in which some of the baffle plate elements have been removed to illustrate the construction thereof.

A suitable preliminary condensation means, according to the most preferred mode of operation of the present invention, is provided by a baffle grating 110, supported by the tops of the radiation shields, which is positioned within the reaction chamber 31 over the heating zone occupied by the charge material. The grating consists of a series of parallel, spaced, angle-iron bars 112 each of which extends, respectively, completely across the width of the reaction chamber as shown in Figure 2. The baffle grating is shown in greater detail in the enlarged view of Figure 3. The angle irons are held in the desired spaced relationship by a transverse rib member 114 to which each of the angle irons is attached, such as by a tack weld. In the present device, the transverse rib member 114 is provided with a series of notches 116 along the bottom edge thereof in which the upper flange of each angle-iron is received. It will be seen that no heat radiations may pass the grid baffle 110 without striking at least one reflection surface thereon.

In operation, the furnace is charged by removing the condenser housing 30, which may be accomplished by the use of a suitable hoist, having grappling hooks for engaging the top plate 46, to raise the entire unit. The baffle 110 is then also removed and a suitable charge placed in the furnace hearth. The baffle grating is then replaced and the condenser unit positioned over the top of the furnace effectively sealing the top opening of the reaction chamber. As will be hereinafter more completely described in connection with examples of specific runs utilizing this or similar apparatus the reaction chamber is then evacuated through the evacuation outlet 58 to the desired evacuation pressure, and the charge heated by supplying electric current to the resistor heating elements 60 and 62 in the conventional manner.

The term "evacuation pressure" as used herein refers to the pressure at the pump device used to draw the vacuum in the reaction chamber; this is, of course, substantially the same as the pressure in the reaction vessel neglecting the partial pressure contribution of the condensible gases formed by the reactions. In a preferred embodiment as above described, the connection of the evacuating device to the reaction chamber is made at a region which is more remote from the charge bed than the condensing surface, such that substantially no calcium vapors exist in the region of the pump outlet. In operation, the evacuation pressure of the chamber is preferably initially reduced to about the desired pressure for the reaction, after which the heating of the charge is commenced. As the temperature of the charge bed is raised, an increase in the evacuation presure is normally apparent due to the evolution of residual gases in the charge, after which the pressure is again reduced to the desired value as the remainder of the heating is continued.

The temperature within the reaction bed may be observed through a sight tube 120 which projects inwardly through the side wall of the furnace and terminates substantially at the center core of the reaction bed. The sight tube is of a conventional type, having an outer transparent member 121 through which the interior of the tube may be observed, and a sealing gasket 122 and adapter 123 rendering the tube fitting gas tight. Suitable cooling coils 124 protect the gasket members when the furnace is in operation. Any conventional optical device such as an optical pyrometer may be used to determine the temperature of the reaction bed by measuring the radiations of the inner end of the tube. In addition, a conventional thermocouple vacuum adapter fixture 125 is provided in the furnace wall as seen in Figure 2, through which suitable thermocouple elements such as indicated by the external ends 126, may be inserted for determining temperatures in localized regions of the furnace. The inner ends of one set of the thermocouples may be disposed, for example, at the edge of the charge bed at approximately the same level as the sighting tube 120 to permit temperature readings in the outer strata of the charge as well as at the core of the charge. The thermocouple elements are electrically insulated, as well understood to those skilled in the art, for example, by means of ceramic tubes in which each element is covered along its length except for the terminal, joined ends. The temperature measuring devices may be connected to suitable recording devices to give a continuous record of the temperatures being measured.

During the heating of the charge in which the reaction material is preferably maintained at a range of 1800° C. to 2200° C. the effective temperature of the baffle element 110 is preferably substantially within a range of 850° C. to 1100° C. This temperature is determined primarily by the spacing of the baffle above the charge bed. In the apparatus shown, this temperature is substantially maintained throughout the greater part of the baffle when it rests directly on the top of the radiation shielding shells 108. However, this distance may vary under changing operating conditions. For example, upon determination that the baffle temperature is greater than desired, which may occur, for example, at elevated operating temperatures or when the surface of the charge bed approaches more closely the level of the baffle, the baffle may be raised by placing spacer elements such as graphite spacer blocks in between the bottom of the baffle and the top of the radiation shields. In this manner, the baffle may always be positioned at the desired level such that it is maintained at the proper temperature during operation of the furnace.

It has been found in the above furnace apparatus that small amounts of calcium have been deposited along the outer peripheral regions of the baffle indicating a peripheral zone of less than the desired baffle temperature. This occurrence results partly from the heat drop at the wall of the furnace which is quite pronounced above the level of the radiation shields. This effect may be overcome by extending one or more of the radiation shields above the level of the baffle and around its outer periphery, so as to more effectively retain the heat in the zone of the baffle. Peripheral cold zones in the baffle 110 are also formed where the baffle is more remote from the radiation surface of the charge bed such as in the regions diametrically opposite to the elongated resistor heating elements. This effect, however, may also be overcome by the provision of a baffle more closely approaching a thermal symmetry with respect to the heated charge bed in which substantially all portions of the baffle are more uniformly spaced from the radiation charge surface. If desired, it is also possible to provide auxiliary heating means at the outer region of the baffle element. In any event by suitable provision the baffle may be maintained substantially throughout its total area within the desired temperature range such as to cause the preferential separation of the extraneous gases and vapors without causing condensation of the calcium vapors.

At the end of the run, after the furnace has cooled sufficiently, the condenser is again removed from the top of the furnace to permit the calcium condensation product deposited thereon to be collected. This is readily accomplished by scraping the calcium deposit from the metal condenser plate and permitting it to drop into a suitable tray or receptacle. The baffle may be cleaned for the following run, also, by scraping off the deposits thereon, consisting of the trapped impurities. The reaction residue is then removed from the furnace to prepare for a subsequent run. For example, most of the residue may easily be shoveled out by hand and the remaining particles then removed by a suction-type vacuum cleaner device. However, as a result of the present arrangement wherein the carbide provides its own crucible, the residue also may be removed by detaching the bottom plate of the furnace and either dropping the bottom plate or raising the furnace shell and radiation shields. In either event the hearth may be made readily accessible, allowing the residue to be removed with ease.

A modified construction of the furnace shown in Figure 1 is illustrated in Figure 5. In the modified construction, the bottom plate 26 of the furnace is provided with four well recesses 126, in which the respective resistor element support posts are seated, two such recesses being shown for accommodation of the posts 66' which are secured therein by means of connector fittings 76, identical to those used in the above described furnace. The posts 66' are identical to the resistor holder posts 66 of the furnace shown in Figure 1, with the exception that they are of greater length to allow for the depth of the well recesses. A slightly smaller spacing is provided between the plate 100 and the furnace bottom than is provided in the furnace arrangement for the construction of Figure 1, such reduced spacing resulting from the smaller blocks 102'. When the furnace hearth is charged, the spaces around the electrodes such as in the circular cut-out openings 106' and 107', are packed with carbide substantially as before. In the present case, an additional quantity of carbide is added to fill the space surrounding each of the electrodes within the wells 126. The primary objective of this modified construction is to enable the water-cooled connector fitting 76 to be positioned more remotely from the heated reaction bed to thereby reduce the loss of heat from such cooling and increase the thermal efficiency of the reaction.

The resistor heating elements, or plates, 60 and 62 may take alternative forms such as shown in Figures 6, 7, and 8. Referring to Figures 6 and 7, a resistor element 60' is shown which is substantially the same as the element 60' with the exception of the provision of a series of horizontally projecting rods arranged in an upper row 128 and a lower row 129, extending over the length thereof. The rods 128 and 129 are friction seated in the resistor element and terminate at their outer ends in close proximity to the surrounding inner radiation shield 108. In this alternate embodiment, two such resistor heating elements are used in place of the elements 60 and 61 in which the horizontal rods extend outwardly from each of the plate-like elements toward the corresponding furnace side walls. The rods afford direct thermal conduction from the heated elements to the outer regions of the charge bed to heat the bed more uniformly. A further modification of the resistor elements is shown in the form of the element 60" in Figure 8. In this instance, the resistor element 60" is provided with elongated openings 130 which limit the current carrying portions of the electrode to the elongated sections 131. This form of electrode construction is preferred for the elements 60 and 62 when a relatively large vertical dimension of the resistor element is desired for heating relatively deep charge beds. The cutaway areas are proportioned to provide any desired, effective, over-all electrical resistance and to afford a relatively uniform distribution of the heat generated by the resistor element.

The heating zone, or hearth, of the furnace 20 may also be slightly modified as shown in Figure 9. Referring to this figure of the drawing, it will be noted that a pair of vertical bulkhead plates 128 are disposed at opposite sides of the resistor heating elements 60 and 62 and that a pair of V-shaped bulkhead plates 130 are arranged along the inner side wall of the radiation shields opposite the ends of the resistor element. The bulkhead plates all rest on the sheath 104, covering the bottom plate 100 of the furnace hearth and extend upwardly to about the level of the tops of the heating elements. These plates are not permanently attached to the surrounding radiation shield 108 with which they are in contact but are merely imbedded in the charge material and held in place thereby. Spaces 132 behind each of the bulkheads may be charged with a relatively fine material which does not enter into the reaction under normal circumstances. The objective of the bulkhead members is to define a space, a chamber, 134 around the resistor heating elements within which the calcium vapors evolved from the reacted charge material will be substantially confined to flow upwardly to the charge surface, to thereby reduce the tendency of these vapors to travel laterally to surrounding cooler portions of the bed in which such vapors might be condensed or be retarded during flow to the surface of the charge bed.

In the present invention the form of heating, such as described above, is preferred, in which heating elements, such as a series of graphite resistor elements, are placed directly in the charge. It will be noted that the steel retort, or furnace chamber, within which the charge is placed is substantially incapable of giving off or introducing into the reaction chamber, when heated, any extraneous vapors, and, at the same time, is non-porous and has sufficient strength to withstand the differential pressures acting thereon. The heating elements are preferably arranged within the charge bed and regulated such that a thermal gradient is produced in the charge to afford relatively cooler strata of the charge bed surrounding the core of material at the reaction temperature, which is below reaction temperature and is thus not dissociated in the reaction. This in effect provides a container of calcium carbide, as a lining in the retort, in which the reaction occurs. It has been found that such control of the temperature within the charge bed is possible due to the varying conductivity of the calcium carbide charge with temperature, and the greatly increased thermal conductivity of the high purity carbide preferably used in accordance with the invention. This insulating effect can be magnified by the placement of relatively fine carbide material in the outer strata of the charge bed. These strata, which are below reaction temperature, thus act as an excellent insulation affording a sufficient temperature gradient between the inner reaction zone and the surrounding walls of the retort so that the wall temperature of the retort does not exceed the maximum temperature to which the retort may be safely subjected. In addition, the resistor heating elements, also, are so disposed with respect to the walls of the retort that when the charge placed therein is heated to reaction temperature, the surrounding unreacted charge material and the chamber walls up to the baffle, within which the calcium vapors are confined, are heated at least to 850–900° C. In this manner, condensation of calcium vapors in the charge bed is prevented and the consequent loss in yield of calcium from the charge avoided. In regulating the power supplied to the electrodes for heating the charge, it is preferred that the maximum available power be delivered until the outer charge strata, at the furnace wall, is heated substantially to the maximum permissible working temperature of the adjacent furnace wall and that thereafter the power input be regulated to maintain, but not exceed, such wall temperature. In a steel retort, or furnace, such as described above, this temperature is about 1300° C.

It has been determined that the physical nature of the charge bed also constitutes a significant factor in the operation, or performance, of the dissociation reaction when carried out according to the present invention. In this connection it has been found that the particle size of the carbide charge approaches a maximum desired particle size beyond which the rate of evolution of calcium vapors from the particle may be retarded. Similarly, a minimum desired particle size is approached below which the interstices in the charge bed are materially reduced and tend to produce a limiting restriction on the rate of evolution of gases from the bed itself. The optimum depth of the charge bed is dependent upon the particle size and is preferably selected such that the restriction of the gas evolution therefrom is not limiting to the reaction. The most desirable particle size and charge bed depth are best determined by actual experiment. Generally, the charge bed must be less in depth with smaller particles than with relatively large particles due to the greater retarding effect on vapor flow of the smaller interstices between smaller particles. As an example, calcium carbide of 20 U. S. mesh has been suitable in a charge bed having an effective depth of about 11 inches. On the other hand, carbide particles of about 2 inches and ½ inch sizes, also, have been used satisfactorily in charge beds of substantially the same depth. In the latter instances, the required kilowatt-hours per pound of calcium product were successively lower as the particle size approached one-half to one inch diameter.

When the physical nature of the charge bed meets these standards, under the reaction conditions according to the present invention, the calcium vapors are readily given off from the charge bed and the diffusion rate of the vapors through the bed will not limit the rate of the over-all reaction.

In a preferred mode of the present invention the condenser, such as described above, is disposed substantially in confronting relation to the charge bed and is spaced therefrom the minimum possible distance, with substantially no restriction therebetween to the flow of calcium vapors other than the preliminary condensation, or baffle means. The minimum spacing of the condenser, in some instances, will be determined by the distance that must be provided between the condenser and the baffle means in order to accommodate the accumulation of deposited metallic calcium on the condenser surface, and by dimensions which may be required to maintain proper thermal balance within the reaction chamber and condenser system.

The condenser surface as previously described is shielded from heat radiations emanating from the heating zone of the furnace. In the apparatus described above, a single element is utilized, constituting the grid baffle 110, which acts both as a shield for the heat radiations and as a preliminary condensation means, effecting the removal of the condensable extraneous gases. It will be understood in accordance with the present invention that separate means may be provided to fulfill these dual functions. Thus, a lower grid may be used to act primarily as a radiation shield and an entirely separate grid-baffle may be disposed between this member and the condenser, at the desired temperature zone, such as to function effectively as an impurity trap in the manner described.

While the lowest possible condenser temperature commensurate with safe operation and desired purity of the product are desired, it has been noted that deposition of calcium on condenser surfaces below the preferred minimum temperature of 250° C. tend to produce the "active" calcium previously described. At higher condenser temperatures, the calcium is extremely stable and may be readily handled in the atmosphere without danger of ignition. Preferably, the condenser is maintained at the upper limit of the preferred condenser temperature range of 250° C. to 500° C., during the initial phase of the reaction and the temperature gradually decreased during the latter phases. During the latter stages of reaction after considerable amounts of calcium have deposited and built up on the condenser, the temperature of the actual condensing surface i. e., the exposed surface of the deposited calcium metal, will be somewhat higher than the temperature of the condenser plate.

It will be seen that by maintaining the condenser within the preferred range of temperatures hereinabove described, the mode of separation of the desired calcium metal product is made to constitute, effectively, a fractional condensation of the gaseous thermal dissociation products. Thus, in addition to the separation of the major impurities referred to previously, including predominantly calcium oxide, by the preliminary condensation baffle, the maintenance of the condenser plate within the preferred temperature range of 250-500° C. effectively prohibits the condensation thereon, with the calcium, of any other impurities, possibly present in the gaseous state, which have condensation temperatures below the temperature of the condenser, within this range. Such gaseous impurities, accordingly, pass beyond the condenser plate at which the calcium is separated, to colder regions of the furnace system at which condensation thereof can occur.

Generally speaking, the calcium carbide charge material used herein contains, in addition to calcium oxide and calcium cyanamide as described hereinbefore, approximately up to 3½ percent of various minor impurities, incurred from the commercial grades of lime and coke used in manufacturing the calcium carbide. These minor impurities are predominantly metallic substances including, for example, iron, silicon, aluminum, magnesium, manganese, and possibly some amounts of copper and silver, and may be found in these concentrations both in regular grade (heretofore conventionally used commercial grade) calcium carbide and in the high gas yield (5.2 ft.$^3$/lb. or higher) calcium carbide used in accordance with the preferred embodiment of the present invention. The high gas yield material used in present invention may therefore be referred to as a high "assay" material, preferably containing at least 88% pure calcium carbide and substantially the balance in the form of calcium oxide, except for trace amounts of calcium cyanamide and approximately up to 3½ percent of minor impurities as described above. Most of the so-called minor impurities are either not evolved from the charge material during the thermal dissociation or are condensed at much higher temperatures than the temperatures at which the calcium metal is collected and thus have no adverse effect on the calcium product or on the reaction. As to certain of the minor impurities, some traces of these materials may possibly be carried to, or be present in, the vicinity of the condenser plate. In this event their effect will be greatly nullified by the above described fractional condensation of the gaseous dissociation products in which any such gases having condensation temperatures lower than that of calcium, also, may be prevented from condensing therewith at the condenser. It is believed that some degree of preferential separation in this manner is obtained with respect to the magnesium impurity content of the calcium carbide charge material which is evolved during the dissociation and with respect to other metallic elements such as sodium and potassium when they are present in the charge material. The preferential separation of the calcium at this stage, however, is relatively insignificant in the over-all method for the production of calcium by thermal dissociation of calcium carbide as described herein due to the substantially negligible amounts present of the minor impurity constituents which are affected thereby. The effect is important, however, when the calcium product is to be used for purposes in which even trace amounts of such contaminating materials would be objectionable.

The examples given below are representative of the manner in which the invention may be practiced with apparatus of the type illustrated in the drawings.

*Example I*

The furnace apparatus used was substantially the same as shown in Figures 1 and 2. The resistor heating elements of the furnace each were connected to the secondary terminals of a transformer having a 60 cycle output rating of 18 kva. Each transformer was rated for 440 volt, primary voltage and provided 10.20 open circuit voltage at the secondary terminals. The supply circuits to the resistors were equipped with 180 ampere blowout fuses and with suitable instruments for giving readings of applied voltage and power input. The evacuation system consisted of an oil-ejector pump connected directly to the furnace evacuation outlet and a mechanical displacement-type pump connected in series therewith. The condenser was equipped with a 1270 C. F. M. capacity air blower, and the temperature thereof was measured by two sets of Chromel-Alumel thermocouples. One thermocouple was located at the center and a second was located at the edge of the condenser plate. The evacuation pressure, or pump pressure, was measured by a standard McLeod gauge tapped into the evacuation outlet of the furnace.

In the specific apparatus used in this run, the inner radiation shield, within which the charge bed was confined, was approximately 23½ inches in diameter. The resistor heating elements were of the type shown in Figures 6 and 7, in which a total of 12 of the rods 128 and 129, of one inch diameter, extended outwardly from each of the electrodes. The necked-down principal heating portion of the resistor elements was ½ inch thick, 6 inches high, and 12 inches long; the supporting posts were spaced about 18.5 inches apart, as measured between their vertical axis; the inner faces of the resistor elements were spaced about 4½ inches apart; and the bottom edges thereof were spaced about 1½ inches from the bottom hearth plate 100. The grid baffle consisted of a series of 1 x 1 x ⅛ inch angle irons spaced on ½ inch centers each of which was inclined at about 45°. The radiation shields on which the baffle rested were 11 inches high, thus affording a spacing of approximately 3¼ inches between the bottom of the baffle and the tops of the resistor elements. The condenser plate was approximately 21¼ inches in diameter and was spaced approximately 3¼ inches above the top of the grid baffle. The lower end of the vacuum outlet was arranged about 3 inches above the level of the condenser plate.

In these runs a quantity of ¼ x 0 particles size carbide, obtained by taking all of the particles passing through a standard screen havnig ¼ inch openings, of high purity (5.2–5.4 gas yield), was first placed around the peripheral edges of the bottom hearth plate and packed around the resistor supporting posts, in the openings 106 and 107 in the hearth plate. This packing material was not considered as part of the weighed charge. The tight packing of carbide around the supporting posts was primarily for the purpose of retarding the passage of calcium vapors generated during the reaction, to the cooler bottom plate of the furnace.

A charge of 88 lbs. of high purity calcium carbide (5.2–5.4 gas yield), was placed in the furnace hearth which filled the hearth substantially up to the level of the tops of the resistor heating elements but did not cover them. The charge was first screened so that the particle size thereof consisted of sizes which passed a standard 10 U. S. mesh screen and were retained on a standard 50 U. S. mesh screen; i. e., 10 x 50 U. S. mesh. After sealing the furnace, the mechanical pump was operated until the pressure was reduced to about 30 microns Hg, after which both pumps were operated simultaneously and heating was commenced. Following initial outgassing during which a considerable increase in pressure occurred, the pressure was steadily decreased to 7 microns after about one hour and forty-five minutes of operation, and thence to 3 microns after about four hours where the pressure was maintained throughout the remainder of the run.

The power input to the resistor heating elements remained substantially constant at about 52 kw., throughout the run of 8¼ hours' duration. The total power input, based upon the instantaneous readings of power taken at intervals during the run, was approximated at 429 kwh. After 1¼ hours of heating the temperature of the center of the charge bed was observed to be 1300° C. by optical pyrometer measurements through the sight tube. An ultimate core temperature of approximately 1900° C. was attained at the end of 3¾ hours' heating time which was maintained substantially between 1900° C. and 2000° C. through the remainder of the run until the power was shut off. A thermocouple disposed in the most remote zone of the charge bed, approximately 1¾ inches in from the side wall of the radiation shield attained a reading of about 860° C. after 2¾ hours' heating, which increased steadily to 970° C. at the end of the run.

The condenser temperature, as read by the center thermocouple on the condenser plate, was permitted to rise to 500° C. which occurred after about 2½ hours of heating. Following this, the air blower was operated intermittently during the run to maintain the temperature readings in the range of about 400–500° C. for about three hours, after which the temperature was gradually decreased to a minimum of 205° C. at the end of the run. The temperature readings obtained from the thermocouple at the edge of the condenser plate were approximately 20°–50° C. lower throughout the run than the readings obtained from the center of the condenser.

The furnace was allowed to cool until the condenser reached room temperature and was then opened. A total of 25.25 lbs. of calcium metal was obtained from the run, of which 20.25 lbs. of substantially high purity product was deposited at the condenser and 5 lbs. of visibly lower purity product was deposited around the peripheral portions of the baffle and adjacent furnace side walls. The power applied to the heating elements was computed as 17 kwh./lb. of total calcium product.

*Example II*

The apparatus used in the following runs was substantially the same as used in the run in Example I except for the specific arrangement of the resistor heating elements and furnace hearth. In these runs the bottom of the furnace was constructed as shown in Figure 5 to provide "wells" around the bottoms of the resistor supporting posts and the resistor elements were of the construction shown in Figure 8. A system of bulkhead plates was arranged in the furnace hearth as shown in Figure 9.

The radiation shields in this apparatus were 13 inches high and of about the same inside diameter as in Example I. A zirconia filling was placed between the shields to provide additional heat insulation. The supporting posts for each of the resistors were spaced about 13½ inches apart as measured between their vertical axis; the resistors were ½ inch thick throughout the necked-down central heating zone, of 9 inches length and 9 inches from the top to bottom; the two cut-out portions were each about 2¼ inches wide and were symmetrically arranged; and a spacing was provided, of 7 inches, between the resistor elements, and about 2 inches between their bottom edges and the hearth plate. The grid baffle was of the same construction as described in Example I and spaced above the tops of the resistance heating electrodes about the same distance. The condenser system was substantially identical and the condenser plate was spaced about the same distance above the top of the grid baffle. The bulkhead plates 128 and 130 extended from the hearth plate 100 up to about the level of the top edges of the resistor elements and the side plates 128 were spaced about 5 inches from the resistors.

In these runs, a quantity of relatively fine, high purity calcium carbide of 20 x 50 standard U. S. mesh, particle size was placed around the peripheral edges of the hearth plate and packed around the bottoms of the electrodes as before. This material was tamped down into the post wells 126. Additional material was placed in the spaces between the bulkhead plates 128 and 130 and the radiation shield. The amount of carbide used for such packing was not included in the weight of the reaction charge material.

*Run No. 1.*—A 95 lb. charge of high purity calcium carbide (5.2–5.4 gas yield) was placed within the cavity formed between the bulkhead plates in the furnace hearth, which filled the hearth substantially up to the tops of the resistor elements. The particle size obtained by screening consisted of sizes which passed a standard screen having 2" square openings and which were retained on a standard screen of 1½" size openings; i. e., 2" x 1½" particle size.

After sealing the furnace, both pumps were put into operation until the chamber was evacuated to 5 microns Hg after which heating was commenced. After a rise in chamber pressure during initial outgassing, the pressure dropped steadily during the run and was reduced to 13 microns Hg at the end of the run.

The power delivered to the heating elements during the run varied between 54 and 59 kw., and the total power supplied during the three hours and fifty minutes' duration of the run was 200 kwh., as read on an integrating power meter. After one hour and ten minutes of heating the temperature at the center of the charge bed was observed at 1237° C. with an optical pyrometer, through the sight tube. An ultimate core temperature of 1871° C. was reached after approximately three hours' heating, which was maintained until the power was shut off at the completion of the run. A Chromel-Alumel thermocouple located approximately 1¼" in from the wall of the radiation shield, behind one of the side bulkhead plates in substantially the most remote zone of the carbide packing, reached a maximum temperature reading of 685° C. at the end of the run. A second Chromel-Alumel thermocouple at the center outer face of one of the side bulkhead plates reached its upper limit of measurement, of about 1390° C., after 2¾ hours' heating. At the completion of the run, the side bulkhead plates were found to have been substantially completely melted due to the intense heat in that zone of the furnace hearth.

The condenser temperature as read by the thermocouple at the center of the condenser plate, was permitted to rise, at the outset, to about 500° C. This temperature was reached after about 1½ hours' heating. Thereafter, the blower was operated intermittently to maintain the thermocouple readings in the range of 350-500° C. for the remainder of the run. The corresponding readings for the thermocouple at the perimeter of the condenser plate were in the range of 280°-500° C.

After shutting off the power to the resistors at the end of the run, the furnace was allowed to stand until the condenser cooled substantially to room temperature. During this period, operation of the evacuation pumps was continued. When the furnace was opened, a total of 19.5 lbs. of calcium was removed, of which the major portion was deposited at the condenser. A smaller amount of visibly less pure calcium was scrapped from the peripheral areas of the baffle and adjacent furnace side walls and weighed together with the product from the condenser. The power applied to the heating elements amounted to 10.3 kwh. per pound of calcium metal, for the total weight of the product.

*Run No. 2.*—The apparatus used was substantially the same as in run No. 1 with the exception that the side bulkhead plates 128 were shortened and spaced further from the resistor bars at a distance of approximately 5.5 inches. In addition, a series of 1 inch diameter graphite rods were staggered throughout the charge bed outside of the resistor elements. Six such rods were laid horizontally at different levels of the charge bed between each of the side bulkhead plates and the corresponding resistor elements.

A 77 lb. charge of high purity calcium carbide (5.2-5.4 gas yield) was placed in the furnace as described in run No. 1. The charge placed between the heating resistors consisted of about 35 lbs. of ½" x ⅜" particle size obtained by screening as described previously, and the remainder of the charge placed around the outer sides of the resistors consisted of ⅜" x ¼" particle size. An additional layer consisting of two courses of 2" x 1½" particle size, of partially depleted, high purity calcium carbide, obtained from a previous run, which was not included in the weight of the charge, was placed over the charge bed of the smaller size particles. The tops of the resistor elements were covered by one of these courses of the larger particles giving a total bed depth of about 12 inches.

After sealing the furnace, both pumps were put into operation until the chamber was evacuated to 7 microns Hg. Heating was then commenced. Following a rise in chamber pressure during initial heating, the pressure dropped steadily during the run and reached 13 microns Hg by the time the run was completed.

The power input to the heating elements during the run varied between 54 and 56 kw., and the total power during the run of three hours and forty minutes' duration was 204 kwh., as read on the integrating meter. After one hour and fifteen minutes of heating, the temperature at the center of the charge bed was observed at 1450° C. by optical pyrometer measurement. An ultimate core temperature of 2077° C. was reached after approximately 3½ hours' heating which was maintained until the completion of the run when the power was shut off. The thermocouple in the charge bed at the side bulkhead reached its maximum value of about 1100° C. after about 3¼ hours of heating and the thermocouple in the outer boundary of the charge gave steadily increasing temperature readings up to 820° C. shortly before the power was shut off.

The condenser temperature, as read by the thermocouple at the center of the condenser plate, was permitted to rise to 500° C., which occurred after 1½ hours. Following this, the air blower was operated intermittently during the remainder of the run to maintain temperature readings in the range of about 350°-400° C.; the corresponding readings for the thermocouple at the perimeter of the condenser plate were in the range of 300-350° C.

The furnace was allowed to cool until the condenser reached room temperature and was then opened. A total of 24 lbs. of calcium metal was obtained from the run, of which 17 lbs. of substantially highly pure product was deposited at the condenser and 7 lbs. of lower purity product was deposited around the peripheral portions of the grid baffle and adjacent furnace side walls. The power applied to the resistor heating elements for the reaction amounted to 8.1 kwh./lb. of total calcium product.

The calcium metal deposited at the condenser was accumulated from several runs carried out in substantially the same manner as described in Example I. The accumulated sample, when subjected to standard chemical and spectrographic analytical procedures gave the following typical quantitative analysis:

| | |
|---|---|
| Total calcium present | percent 98.2 |
| Nitrogen | do 0.17 |
| Free carbon | do 0.3 |
| Combined carbon | do 0.06 |
| Oxygen | do 1.04 |
| Aluminum | p. p. m. 100 |
| Iron | p. p. m. 220 |
| Silicon | p. p. m. 50 |
| Manganese | p. p. m. 50 |
| Magnesium | p. p. m. 80 |

It will be understood that calcium of higher purity than represented by the above analysis can be obtained. Thus, for example, calcium metal has been obtained in accordance with the present invention having a purity in excess of 99 percent, wherein the remainder of the obtained product consisted of trace amounts of various impurities, such as represented in the above analysis.

In a run conducted in a manner similar to that in Example I, the deposits in the baffle, representing the trapped impurities separated in the process, were collected and analyzed chemically, with the following results:

| | |
|---|---|
| Total calcium | percent 65.7 |
| Free carbon | do 0.3 |
| Total carbon | do 10.30 |
| Oxygen | do 14.3 |
| Nitrogen | do 0.31 |
| Gas yield ($C_2H_2$) | cc./g. 116 |

On the basis of this analysis the calcium oxide content and calcium carbide content of the deposits were calculated to be in the ratio of 2.4 to 1, respectively.

While certain specific examples and embodiments of the invention have been described above for the purpose of illustrating its nature and operation, it is to be understood that various modifications thereof are possible, and that the invention may be utilized and practiced by those

We claim:

1. The method of producing calcium by the thermal dissociation of calcium carbide containing lime as an impurity, comprising heating a charge of said calcium carbide to reaction temperature to cause dissociation of said calcium carbide and evolve calcium vapor from said charge, said heating producing a side reaction of said lime with said calcium carbide to form extraneous gases including carbon monoxide, passing the calcium vapors and said extraneous gases through a preliminary, purification zone in which the calcium vapors and said extraneous gases react to form solidified, reaction products, removing said solidified reaction products from the remaining calcium vapors and thereafter separately collecting the calcium product.

2. The method of producing calcium by the thermal dissociation of calcium carbide, as set forth in claim 1 wherein said calcium product is obtained by condensation on a surface spaced from said preliminary purification zone and more remote from said charge than said preliminary purification zone.

3. The method of producing calcium by the thermal dissociation of calcium carbide, according to claim 2 wherein said preliminary purification zone comprises a heat exchanger surface in which said solidified reaction products are obtained substantially within a temperature range of 850° C. to 1100° C.

4. The method of producing calcium by the thermal dissociation of calcium carbide according to claim 3 wherein said calcium product is obtained by condensation at temperatures within the range of 250° C. to 500° C.

5. The method of producting calcium by the thermal dissociation of calcium carbide according to claim 4 wherein said calcium product is obtained at least intially during the process at the upper limit of said condensation temperature range.

6. The method of producing calcium by thermally dissociating calcium carbide containing impurities, comprising heating a charge of calcium carbide above 1800° C. to cause dissociation thereof and evolve calcium vapors therefrom together with extraneous gases resulting from simultaneous reactions of impurities contained in said charge, passing said calcium vapor and extraneous gases through a controlled-temperature, heat-exchanger baffle, effective to remove said extraneous gases as solidified reaction products, and obtaining the calcium condensate product substantially free of said charge impurities.

7. The method of producing calcium by thermally dissociating calcium carbide according to claim 6 wherein said heat-exchanger baffle effects the removal of said extraneous gases within the temperature range of 850° C. to 1100° C.

8. The method of producing calcium by thermally dissociating calcium carbide according to claim 7 wherein the impurities in said calcium carbide charge consist predominantly of calcium oxide and the effect of the smaller amounts of other impurities therein is substantially negligible.

9. The method of producting calcium by thermal dissociation of calcium carbide comprising heating a bed of calcium carbide to reaction temperature in a closed chamber, evacuated to a pressure at least below the dissociation pressure of calcium carbide at the reaction temperature, condensing the resulting calcium vapors in substantially pure form on a cooled surface forming a wall of said chamber, not directly exposed to heat radiations from said charge bed, and interposing between the reacted charge material and said condenser surface, a baffle means effective during said reaction, preferentially, to separate undesired impurities as solidified reaction products, at a temperature of from 850° C. to 1100° C.

10. The method of producing calcium by thermal dissociation of calcium carbide according to claim 9 wherein said chamber is at an evacuation pressure less than atmospheric pressure.

11. The method of producing calcium by thermal dissociation of calcium carbide according to claim 10 wherein said evacuation pressure is within the range of one to fifty microns Hg during the thermal dissociation.

12. The method of producing calcium by the thermal dissociation of calcium carbide comprising heating a charge bed of calcium carbide within a container defining a reaction chamber, controlling the heating of said charge bed such as to heat only the central portion of said bed to thermal dissociation temperature and provide a boundary layer between said reacted material and the walls of said container which is below the reaction temperature and such that said boundary layer is heated to a temperature less than the working temperature of the walls of said container and higher than about 850° C., passing the gases evolved from the charge through a preliminary, purification zone in which gaseous impurities are separated as solidified reaction products and subsequently obtaining the calcium product substantially free of impurities.

13. The method of producing calcium by the thermal dissociation of calcium carbide according to claim 12 wherein said charge bed is heated by means of resistor elements placed directly in the charge bed.

14. A process for producing calcium in which a porous bed of high purity calcium carbide, containing less than 12% of impurities of which more than 8½% is calcium oxide and the remainder minor amounts of impurities normally present in carbide manufactured in electric furnaces from commercial sources of lime and carbon, is heated at subatmospheric pressure to a temperature of at least 1800° C. sufficient to dissociate the carbide thermally and evolve gaseous calcium from said bed, said calcium being separately collected and condensed in solid form.

15. The method of producing calcium by the thermal dissociation of calcium carbide comprising heating a charge of calcium carbide, having a gas yield of at least 5.2 ft.³/lb. to a thermal dissociation temperature to liberate and evolve calcium vapor therefrom together with other gases resulting from impurities in said charge material, separating said gases as solidified reaction products in a preliminary purification zone and obtaining the calcium metal product by condensation.

16. The method of producing calcium by the thermal dissociation of calcium carbide according to claim 15 wherein said preliminary purification zone is maintained at temperatures within the range of 850° C. to 1100° C.

17. The method of producing calcium by the thermal dissociation of calcium carbide comprising heating a charge of commercial grade calcium carbide, containing impurities, to dissociation temperature, passing the evolved calcium vapors and the extraneous gases resulting from the reaction of said impurities in said charge together through a preliminary purification zone, removing said extraneous gases in the form of solidified reaction products in said preliminary, purification zone and subsequently obtaining the calcium product by condensation substantially free of contaminating impurities.

18. Apparatus for the production of calcium metal by the dissociation of calcium carbide comprising a furnace having a substantially non-porous metal retort defining a reaction chamber, means for evacuating said retort to a controlled evacuation pressure, means disposed in a heat insulated portion of said chamber constituting the heating zone thereof for heating a charge of calcium carbide therein to dissociation temperature, a controlled temperature condenser surface for removing the calcium condensate forming a wall of said retort, and adjustably positioned, controlled temperature baffle means disposed intermediate said heating zone and said condenser surface effective to be contacted by gases evolved during the dissociation of the calcium carbide at a temperature above that of said condenser, said baffle being arranged in direct confronting relation to the evolution surface of the charge bed placed in said heating zone and adjustably spaced from said charge bed and supported within said retort so as to effectively minimize heat loss therefrom to the exterior of the furnace.

19. A process of producing calcium by the thermal dissociation of calcium carbide comprising placing, in a retort chamber, a charge bed of calcium carbide, in the form of granular particles of high purity calcium carbide having a gas yield greater than 5.2 ft.³/lb. and containing lime as the major impurity, heating said charge at subatmosphere pressure by electrical-resistance heating means disposed within said charge bed such that a decreasing temperature gradient is produced from the heating means to the outer strata of said bed and such that an inner zone of said charge bed, adjacent said heating means, is heated to a dissociation temperature of at least 1800° C., during at least the initial phase of dissociation, while the outer strata interposed between said inner zone and the surface of said charge bed, from which the dissociated calcium vapors are evolved, is below said dissociation temperature, producing calcium vapors by said dissociation of the calcium carbide together with other gases, including carbon monoxide, resulting from the reaction of said impurities with the calcium carbide, passing said calcium vapors and other gases from said inner zone, through said outer strata, continuing said heating to dissociate at least a portion of said outer strata, and collecting the calcium vapors evolved from said charge bed by condensation.

20. A process for thermally dissociating calcium carbide to produce elemental calcium in vapor form comprising, submerging a heating element in a gas pervious charge bed composed of calcium carbide and calcium oxide so that said charge bed substantially covers the said element in sufficient thickness to absorb and collect substantially all the heat released by said element and to create a substantial temperature drop between said heating element and the exterior surface of said charge bed, heating said element to a temperature in excess of 1800° C. whereby the carbide in said charge bed is progressively dissociated from said heating element outwardly as the outer layers of said charge bed are successively raised to the dissociation temperature by the heat released by said heating element; withdrawing calcium vapor formed by said dissociation from the inner relatively hot zone of said charge bed through the outer relatively cool portions of said charge bed to a collection zone located exteriorly thereof, and preventing the formation of gas impervious deposits, formations and crusts in the outer relatively cool portions of said charge bed through which said calcium vapors are withdrawn by forming said charge bed from a composition containing calcium carbide and calcium oxide with said carbide being present in an amount exceeding 88% by weight and said oxide being present in an amount less than about 8% by weight.

21. Apparatus according to claim 20 wherein said retort has a removable closure means at the bottom thereof having an opening through which the reaction residue may be removed from the heating zone upon completion of the reaction.

References Cited in the file of this patent

UNITED STATES PATENTS

| | | |
|---|---|---|
| 984,503 | Arsen | Feb. 14, 1911 |
| 2,514,275 | Allen | July 4, 1950 |
| 2,570,232 | Hansgirg | Oct. 9, 1951 |
| 2,684,898 | Barton | July 27, 1953 |

UNITED STATES PATENT OFFICE
CERTIFICATE OF CORRECTION

Patent No. 2,839,380                      June 17, 1958

Sigmund Jaffe et al

It is hereby certified that error appears in the printed specification of the above numbered patent requiring correction and that the said Letters Patent should read as corrected below.

Column 9, line 39, for "presure" read -- pressure --; column 11, line 53, for "element" read -- elements --; line 64, for "a chamber" read -- or chamber --; column 22, line 24, for the claim reference numeral "20" read -- 18 --.

Signed and sealed this 29th day of March 1960.

(SEAL)
Attest:

KARL H. AXLINE
Attesting Officer

ROBERT C. WATSON
Commissioner of Patents